Dec. 8, 1931.  J. A. McCASKELL  1,835,796
CONTINUOUS FILTER
Filed May 3, 1927   2 Sheets-Sheet 1
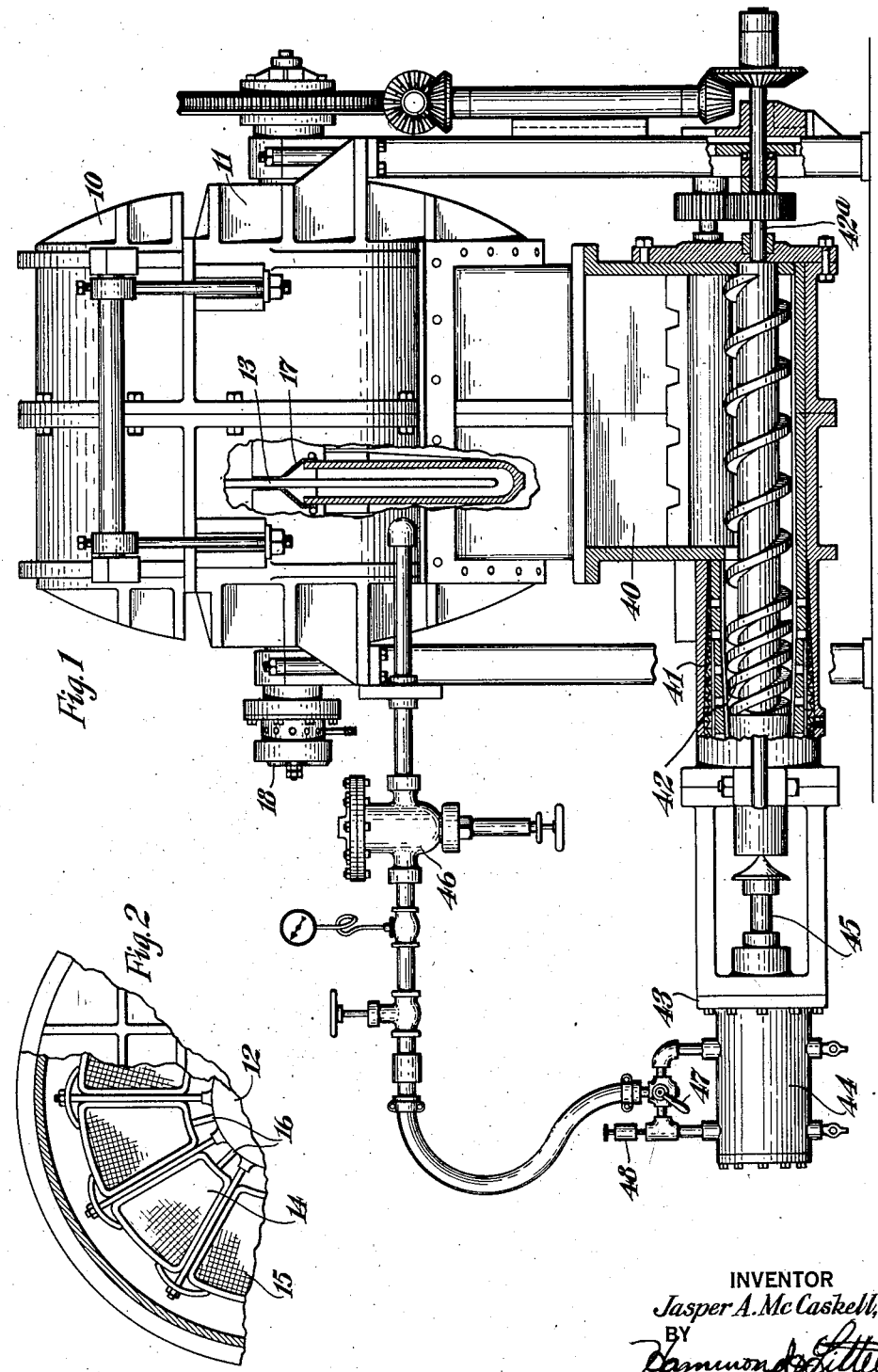
INVENTOR
Jasper A. McCaskell,
BY
ATTORNEYS Dec. 8, 1931.    J. A. McCASKELL    1,835,796
CONTINUOUS FILTER
Filed May 3, 1927    2 Sheets-Sheet 2
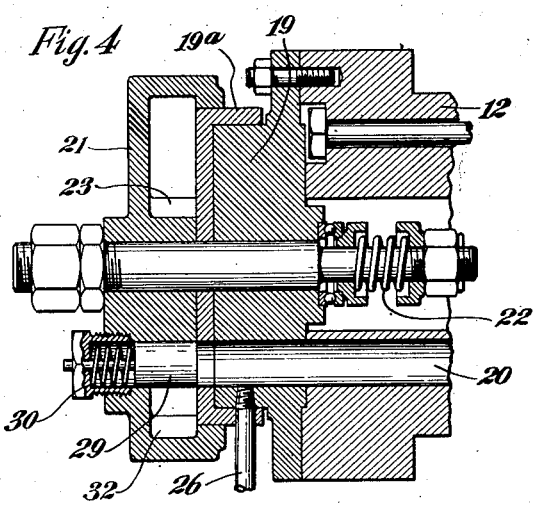
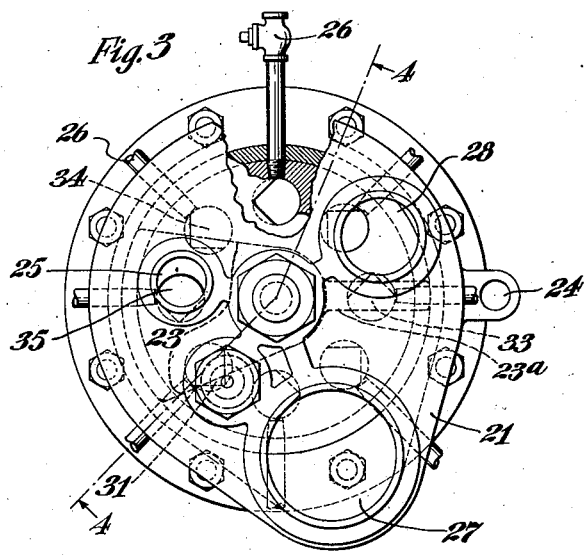
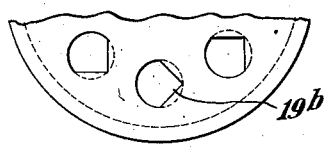
INVENTOR
Jasper A. McCaskell,
BY
ATTORNEYS

UNITED STATES PATENT OFFICE

JASPER A. McCASKELL, OF SALT LAKE CITY, UTAH

CONTINUOUS FILTER

Application filed May 3, 1927. Serial No. 188,419.

This invention relates to filters of the pressure or vacuum type designed to operate in a continuous cycle in which filtration is effected at one point of the cycle simultaneously with the removal of the filter cake at another point and has particular relation to the filtrate valve.

In my copending application Serial No. 57,295, filed September 19, 1925, I have shown a conventional cone type of filtrate valve and one of the objects of this invention is to provide a disc valve for the outlet of the filtrate in which all of the filtrate passages communicate with an open chamber in the female portion of the valve thus permitting the free discharge of the filtrate from the filtrate pipes in all positions of the valve.

A further object of the invention is to provide a valve of this type applicable to pressure or vacuum filters with means to regulate the application of the filter pressure to control the starting of the filtering periods.

Another object of the invention is to provide a filtrate valve that will allow the filtration pressure to be built up more slowly and gradually, preventing sudden surges of filter pressure against the filter cloth which often forces parts of the filter cake through the cloth, and allowing the filter cake to build up more uniformly.

Further objects and advantages will appear as the description of the following drawings illustrating one form of embodiment of the invention proceeds and, in which, Figure 1 is a side elevation of a continuous filter, of the pressure type.

Figure 2 is a cut away view section of the filter leaves.

Figure 3 is an end view of the filtrate valve.

Figure 4 is a cross section of Figure 3 on the line 4—4, and

Figure 5 is a partial end view of the valve ports.

The filter 1 which may be of the pressure type shown in my prior Patent #1,266,133 or of the suction type shown in the Patent #1,259,139 to O. J. Salisbury, comprises upper and lower casing sections 10 and 11 and a central rotary shaft 12 having secured thereto a series of filter leaves 13 of disc like form being adapted to rotate with said shaft, and to have their lower portions projecting into the lower casing 11 containing the solution to be filtered. Each filter leaf 13 is made up of a number of sections or sectors 14 and the sides of these sections are composed of some suitable filter medium 15 beneath which is placed a drainage member of woven wire or other foraminous or open material for holding the fabric sides apart. This construction is well known in the art and is for the purpose of creating an interior chamber in the leaf sectors 14 connected by the pipe 16 to the respective passages in the hollow rotatable shaft 12. By means of either pressure on the outside or a vacuum on the inside of these leaf sections, the filter solution is drawn onto the filter medium, the cake accumulating on the outside to be removed at some subsequent point and the filtrate passing into the shaft and discharged through the valve 18 hereinafter described. The solids, accumulating on the outside of the filter leaves are suitably removed by scrapers or other cake dischargers and drop by gravity into the chute 40.

To assist in removing the filter cake from the disks 13 the filter fabric is caused to vibrate by an oscillating valve means more clearly shown in my copending application Serial 57,295, filed September 19, 1925, which is provided for causing variations in the fluid pressure within the filter leaves and to thereby cause the fabric leaves to pulsate with consequent loosening of the solid material accumulated thereon. In addition to means for loosening the material, means 17 are also provided for deflecting loosened material away from the surfaces of the filter leaf and to prevent the material from falling back into the solution tank. In this way the solid material is more completely removed from the filter leaves than is possible with the ordinary scraping heretofore employed and there is less injury and wear on the filter fabric.

This subject matter is all shown in my copending applications and has no relation to this case other than to show the arrangement of parts to which the following material is applied in a preferred form.

The filtrate which passes through the filter fabric into the central shaft 12 is discharged from the filter by the valve 18 which also provides a means for regulating the starting point at which the filtration will be started in the respective leaf sections. The valve 18 of the filter is of the flat plate or disk type 19, secured to the shaft 12 and has the valve seat 19a designed to register with filtrate conduits 20 that connect with the filter disks 13. A casing 21 is held slidably tight against the plate 19a by means of spring 22 and provides a cavity 32 into which the filtrate flows from the passages 20. The inner face of this casing 21 contacts with the plate 19a and the shape of the inner face or cavity 32 is shown by dotted lines 23 in Figure 3. The lug 24 secured by means of an adjustable connector to any stationary part of the filter allows the casing 21 to be partially rotated, to adjust the period of active filtration in the solution in casing 11, but does not interfere with the rotation of the valve 19 in the casing 21 as is well understood in the art.

The face of the casing 21 thus closes the filtrate ports 20 and allows high pressure blow-back air to reach the inside of the filter leaf when the ports come in front of the blowback air port 25. The pipes 26 leading to the respective filter sectors are for the purpose of flushing or sampling as desired or necessary. The other ports 27 and 28 are the filtrate and wash water ports respectively.

The plunger 29 is held in contact with the plate 19 by means of an adjustable spring 30. This plunger 29 covers the filtrate ports as they revolve past it and the spring 30 is of sufficient tension to allow a small amount of trapped air in the filter bag to escape and thus allow a cake to form on the filter bag very slowly. The cake is just starting to form on the filter bags at the position 31 shown on Figure 3 and at this point the leaf sector is just immersed in the pulp.

The operation of the device is as follows: The filter shaft with the attached filter disks slowly revolves and parts of the discs are first in the solution in the lower casing and then out of immersion. The ports 19b indicate the end of the communicating conduits 20 with the respective leaf sectors 14. Assuming for example, that the rotation in Figure 3 is counterclockwise, the port position at 31 shows that the port is just emerging from under the solid blank portion 23 and as soon as the edge 19b comes from under the plunger 29, the filter pressure will force filtrate into the filter leaves and the filtrate will be discharged through the cavity 32 and through the filtrate port 27. From this position then, until the port 33 passes the lug or wall portion 23a, the corresponding leaf sectors will be under filtration pressure, whether it be the higher inner pressure in the pressure filter or the lower outer pressure in the suction filter. From the port position 33 to the position 34, wash water may be sprayed onto the filter cake or air may be forced thereon for drying, escaping through the wash water port 28.

As the port position 34 comes under or in front of the air blow back port 25, the alternate puffs of air under pressure loosen the cake as has been previously described. From this position 34 then to the position 31, first described, the cake is suitably removed in the proper place on the filter leaves.

The plunger 29 cooperating with the pointed side of the ports 19b allows a gradual escape of the air trapped from the position 35 to the position 31 as the tension of the spring 30 provides for this, and the filtrate will escape in gradually increasing quantities as the entire port is opened by completely passing beyond the plunger 29. At this point of the cycle, the sector is under full filtering pressure.

A more gradual building up of the pressure might be desirable and for such purposes, a series of plungers might be provided. The tension of the spring 30 might also be regulated as desired.

By this gradual building up of the filter pressure on the leaf sectors, the sudden exposure to high pressure forcing the finer particles through the filter bag is avoided and the smaller particles will also build up, protecting the cloth, increasing the capacity of the filter and allowing discharge of clearer filtrate.

In order to automatically remove the filter cake in the pressure filter which drops into the chute 40 by gravity, and to prevent the loss of pressure in the filter casing, I have provided a discharge mechanism comprising a casing 41 in which is a worm 42 mounted on a shaft 42a and keyed thereto to receive the filter cake as it drops down the chute. The casing 41 is tapered at one end to provide a restricted outlet and a shoulder which abuts the side of the casing to provide an air seal. On the outside of the filter is attached a discharge valve 43 comprising an air cylinder 44 embracing a piston operated tapered plug valve 45 on which is an effective pressure equal to the filter pressure which is maintained by suitable piping and pressure regulating valve 46 connected with the interior of the filter press or any high pressure air supply; the desired pressure being obtained by means of pressure reducing valve 46.

The air pressure maintained in the air cylinder 44 is just sufficient to balance the air pressure in the filter press and thus will at all times seal the discharge outlet by means of the tapered plug valve 45, to prevent the escape of air. It will allow the free discharge of the filter cake, however, because by means of the additional pressure imposed upon the cake by the action of the screw thread discharge means 42, the balanced action will be overcome to permit the discharge of the cake. Thus the discharge is automatic and variations in the character of the cake are compensated for. The four way valve 47 permits complete opening of the valve 45 for the purpose of flushing, and the valve 48 may be any preferred automatic releasing valve which will be set at desired pressure to prevent rupture or sudden undue pressure on the discharge cake.

Various modifications of my invention may be resorted to and certain parts of the invention may be used independently without departing from the spirit of the invention. I do not desire, therefore, to limit my invention to any specific modification but to interpret it broadly within the scope of the appended claims.

I claim:

1. In combination with a continuous filter of the class described comprising a hollow rotatable shaft with interior conduits, a disc valve rigidly attached to said shaft and having ports communicating with the interior conduits in said rotatable shaft, a valve casing resiliently held in tight contact with said disc valve, said casing being provided with a multiplicity of chambers, a resiliently operated plunger adapted to yield under abnormal filter pressure cooperating in turn with each of said ports to cause a gradual formation of filter cake.

2. In a filtering apparatus of the class described a filtrate valve comprising a valve seat attached to the end of a hollow rotatable shaft, ports in said shaft, a valve casing held against rotation, a resiliently actuated plunger operating on said valve seat, valve intake and outlet connections leading to said valve, said plunger uncovering said ports to permit the gradual formation of the filter cake.

3. In a filtering apparatus of the class described, a hollow rotatable shaft, filter leaves attached thereto and whose hollow interiors are connected to respective passages in the hollow shaft, a filtrate valve seat with pointed valve ports attached to said rotatable shaft, a fixed casing having cooperating ports and a plunger sealing each respective rotatable port until it has passed by the pointed side of the valve opening first to allow gradual formation of filter cake at first.

4. In a pressure filter of the class described, a hollow rotatable shaft, filter leaves mounted on said shaft and having their interiors communicating with respective passages in said shaft, a filter valve, a filter casing including a resiliently actuated plunger, the valve including a series of ports one side of which are V shaped, the filter valve cooperating with the plunger so that the V shaped side passes the plunger first and thereby allowing the pressure within the filter leaves to build up gradually.

5. In a pressure filter of the class described, a hollow rotatable shaft with filter leaves mounted thereon and whose interiors are connected with respective passages in the shaft, a filter valve integral with the end of the shaft provided with a series of ports, the ports being cylindrical on one side and V shaped on the other, a casing integral with said filter provided with a plunger, the plunger allowing gradual opening of the filter valve ports as the V shaped side rotates past first to allow gradual increase of the filter pressure in the filter leaves and a consequently more uniform cake.

6. In a continuous filter of the class described, a hollow rotatable shaft, filter leaves whose interiors are connected with the interior of said shaft, a disc filtrate valve on the end of said shaft, ports in said valve, a piston plunger cooperating with said ports to regulate the flow of filtrate through said filter leaves, and to force the gradual formation of filter cake on the filter leaves, means to remove the filter cake and means to discharge the cake comprising a revolving worm and a pressure operated plug discharge valve, the effective sealing pressure being substantially that of the filter and communicated therefrom, to prevent the loss of the filtering pressure.

7. In a filter of the class described, a hollow rotatable shaft, and filtering means mounted thereon, the filtering means being adapted to separate the filtrate from the filter cake, means for removing the filter cake and discharging it from the filter without reducing the filter pressure comprising a worm, a restricted passage, a plunger valve, and means to communicate the filter pressure to the plunger valve to balance the pressure on the valve, said worm compacting said cake and over-balancing said plunger valve pressure.

8. In a filtering apparatus of the class described, a filtrate valve comprising a valve seat attached to the end of a hollow rotatable shaft, ports in said shaft, a valve casing held against rotation, a resiliently actuated plunger operating on said valve seat, valve intake and outlet connections leading to said valve, said plunger being adapted to move slight amounts upon abnormal increase of filter pressure to uncover said ports.

9. In a filtering apparatus, a hollow rotatable shaft having interior conduits, segmental filter leaves on said shaft, the segments of which are each connected to the interior conduits, a disc filtrate valve secured to the end of said shaft, said valve having a plurality of ports therein, one side of said ports being of angular shape, a stationary valve casing adjacent said valve, a plunger in said casing cooperating with each of said ports and passing over the angular side of each of said ports in turn to permit discharge of filtrate at various rates to cause a gradual formation of filter cake on the filter leaves.

10. In a pressure filter of the class described, a hollow rotatable shaft, filter leaves mounted on said shaft, and having their interiors connecting with respective passages in said shaft, a filter valve with cooperating ports to consecutively allow the filtrate from the pulp to be forced through the filter, a valve casing, a plunger in said casing adapted to be partially displaced in accordance with the filter pressure, and cooperating with each of said ports in consecutive order to permit gradual building up of filter cake on the filter leaves, and pneumatic means to prevent loss of the filter pressure within said filter, during discharge of the subsequently formed cake.

11. In a filtering apparatus of the class described, a filter medium, drainage means therefor, a filtrate valve having ports therein, controlling said drainage means, a casing, and a spring pressed plunger in said casing cooperating with said filtrate valve ports whereby the initial drainage rate is low and builds up slowly.

12. In a pressure filtering apparatus of the class described, a filter medium, means to drain the filter medium, a filtrate controlling valve intermediate said filter medium and said drainage means, said valve having a port therein, a valve casing for said valve and a resiliently acting plunger therein adapted to cooperate with said port whereby said resilience is adapted to be over-balanced by the filtrate pressure to permit a gradual initial filtration rate.

13. A continuous pressure filter of the class described comprising a filter medium, a sludge tank surrounding a portion of said filter medium, drainage means for said filter medium whereby a filter cake is formed on said filter medium, cake removal means, cake discharge means, a pressure valve controlling said discharge means and a pressure communicating connection between the filter casing and the discharge controlling valve.

14. A continuous pressure filter of the class described, a filter casing, a filter medium, a sludge tank surrounding a portion of said filter medium, means to form a filter cake on said filter medium, means to discharge the filter cake from said filter, a plug valve in said discharge valve and a pressure communication between said filter casing and said plug valve whereby the filter pressure may be maintained on said valve, and means to over-balance said filter pressure to permit cake discharge.

In testimony whereof I have affixed my signature to this specification.

JASPER A. McCASKELL.